US008930888B2

(12) United States Patent
Canches (10) Patent No.: US 8,930,888 B2
(45) Date of Patent: Jan. 6, 2015

(54) MODELLING SERIALIZED OBJECT STREAMS

(75) Inventor: Julien Canches, Toulouse (FR)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/535,790

(22) Filed: Jun. 28, 2012

(65) Prior Publication Data

US 2013/0007695 A1 Jan. 3, 2013

(30) Foreign Application Priority Data

Jun. 29, 2011 (EP) .................................... 11290304

(51) Int. Cl.
| | | |
|---|---|---|
| *G06G 1/14* | (2006.01) | |
| *G06F 15/16* | (2006.01) | |
| *G06F 9/44* | (2006.01) | |
| *G06F 9/45* | (2006.01) | |
| *G06F 9/46* | (2006.01) | |
| *G06F 3/00* | (2006.01) | |
| *G06F 13/00* | (2006.01) | |

(52) U.S. Cl.
CPC .................................... *G06F 8/315* (2013.01)
USPC ............ 717/104; 705/22; 709/200; 709/246; 717/100; 717/102; 717/108; 717/113; 717/115; 717/120; 717/124; 717/136; 717/137; 717/149; 718/102; 719/316; 719/330; 719/331

(58) Field of Classification Search
CPC ......... G06F 9/44; G06F 9/541; G06F 9/4435; G06F 8/61; G06F 11/1482; G06F 11/1438; G06F 11/1474; G06F 11/2041
See application file for complete search history.

(56) References Cited

U.S. PATENT DOCUMENTS

| | | | |
|---|---|---|---|
| 6,449,660 B1 * | 9/2002 | Berg et al. ...................... | 717/100 |
| 6,928,488 B1 * | 8/2005 | de Jong et al. ................ | 709/246 |
| 7,207,002 B2 * | 4/2007 | Mireku .......................... | 717/115 |
| 7,296,275 B2 * | 11/2007 | Colley et al. .................. | 719/316 |
| 7,330,870 B1 * | 2/2008 | Davis et al. .................... | 709/200 |
| 7,441,253 B2 * | 10/2008 | Atkinson et al. .............. | 719/331 |
| 7,647,597 B2 * | 1/2010 | Krishnaswamy et al. ..... | 719/319 |
| 7,962,925 B2 * | 6/2011 | Fry et al. ....................... | 717/136 |
| 2002/0124118 A1 * | 9/2002 | Colley et al. .................. | 709/315 |
| 2003/0200533 A1 * | 10/2003 | Roberts et al. ................ | 717/124 |
| 2004/0111702 A1 * | 6/2004 | Chan ............................. | 717/113 |
| 2004/0172626 A1 * | 9/2004 | Jalan et al. .................... | 717/149 |
| 2005/0071809 A1 * | 3/2005 | Pulley ........................... | 717/108 |
| 2005/0108627 A1 * | 5/2005 | Mireku .......................... | 715/513 |
| 2005/0268276 A1 * | 12/2005 | Tankov et al. ................ | 717/102 |
| 2005/0268309 A1 * | 12/2005 | Krishnaswamy et al. .... | 719/330 |
| 2006/0095332 A1 * | 5/2006 | Riemann et al. ............... | 705/22 |
| 2006/0218538 A1 * | 9/2006 | van Kesteren ................ | 717/137 |
| 2006/0235876 A1 | 10/2006 | Plouffe, Jr. | |
| 2007/0074228 A1 | 3/2007 | Suzumura et al. | |
| 2010/0211753 A1 * | 8/2010 | Ylonen .......................... | 718/102 |
| 2013/0047135 A1 * | 2/2013 | Joshi et al. .................... | 717/120 |

* cited by examiner

*Primary Examiner* — Don Wong
*Assistant Examiner* — Anibal Rivera
(74) *Attorney, Agent, or Firm* — Cuenot, Forsythe & Kim, LLC

(57) ABSTRACT

Modelling a serialized object stream can include receiving a stream of bytes corresponding to the serialized form of a first object, creating an empty initial model for containing a generic object and a generic class, and, upon detection of a class from the stream, constructing a corresponding generic class object in the model using a processor. Upon detection of a new object from the stream, a corresponding generic object in the model can be constructed. Further objects and classes in the model that are associated with the generic objects and classes can be referenced.

22 Claims, 7 Drawing Sheets

MODELLING SERIALIZED OBJECT STREAMS

CROSS-REFERENCE TO RELATED APPLICATIONS

This application claims the benefit of European Application Number 11290304.2 filed on Jun. 29, 2011, which is fully incorporated herein by reference.

BACKGROUND

Java Object Serialization (Java is a trade mark of Sun Microsystems, Inc.) encodes an objects graph as a stream of bytes that is unreadable by the user. The only way to inspect (and potentially modify) this stream of bytes is to write a Java application, linked with the library containing the definition classes of the serialized objects, that reads this stream and displays it in a user-friendly way.

Although Java Object Serialization is discussed in detail, the described method and system may be implemented in languages other than Java (for instance, C++, C# or JavaScript embedded in a browser).

Java Object Serialization is a mechanism that supports encoding of an object and the objects reachable from it into a stream of bytes, and the reverse decoding operation. This mechanism is broadly used to address two problems:

1. Persistence of a Java object graph.
2. Inter-process communication.

As far as inter-process communication is concerned, two types of usages have emerged:

2a. Remote Method Invocation (RMI) is a Java built-in framework for transparently manipulating instances living in a remote process.

2b. Use of the serialized stream as the message exchanged between a client and a server. In this case, Java Serialized Objects are often used as an alternative to XML (extended markup language), if both clients and servers are using Java.

Usages 1 and 2b have one common point: the "serialized form" of a Java object graph is stored in a location external to the software that is able to read and write it, be it the file system, a database or a communication layer such as the HTTP (hypertext transfer protocol) protocol. This aspect allows a user to inspect the content of the serialized form. There are various reasons why a user would want to do this:

In an application debugging phase, one would want to verify that the serialized form contains the expected data, to determinate if the problem occurs before serialization, or after deserialization (or on the client or server side if a client-server architecture is involved).

In a testing phase, one would want to test half of the system (data producing vs. data consuming), verifying that a sub-system sends the expected data, or accepts a set of input data, without relying of the other sub-systems.

While evaluating security, one would want to verify which data could be exposed to a malicious user.

The common solution to address these concerns is to write an ad hoc Java application, linked with the library that contains the definition classes of the serialized objects. The Java application needs to be hand-written, or can be generated by an automatic tool that first deserializes the objects, then uses Java reflection to display their content. Either way, the definition classes library of the objects is required, and some manual steps are required in order to view the serialized stream content.

BRIEF SUMMARY

According to a first aspect, there is provided a method for modelling a serialized object stream. The method includes receiving a stream of bytes corresponding to the serialized form of a first object; creating an empty initial model for containing a generic object and a generic class; upon detection of a class from said stream, constructing a corresponding generic class object in the model using a processor; upon detection of a new object from said stream, constructing a corresponding generic object in the model; and referencing further objects and classes in the model that are associated with the generic objects and classes.

According to a second aspect, there is provided a system for modelling a serialized object stream. The system includes a processor configured to perform operations. The operations include receiving a stream of bytes corresponding to the serialized form of a first object; creating an empty initial model for containing a generic object and a generic class; upon detection of a class from said stream, constructing a corresponding generic class object in the model; upon detection of a new object from said stream, constructing a corresponding generic object in the model; and referencing further objects and classes in the model that are associated with the generic objects and classes.

According to a third aspect, there is provided a computer program product for modelling a serialized object stream. The computer program product can include a computer readable storage medium having program code embodied therewith, wherein the program code is executable by a processor to perform operations. The operations include receiving a stream of bytes corresponding to the serialized form of a first object; creating an empty initial model for containing a generic object and a generic class; upon detection of a class from said stream, constructing a corresponding generic class object in the model; upon detection of a new object from said stream, constructing a corresponding generic object in the model; and referencing further objects and classes in the model that are associated with the generic objects and classes.

BRIEF DESCRIPTION OF THE SEVERAL VIEWS OF THE DRAWINGS

The subject matter regarded as the one or more embodiments of the invention is particularly pointed out and distinctly claimed in the concluding portion of the specification. The one or more embodiments, both as to organization and method of operation, together with objects, features, and advantages thereof, may best be understood by reference to the following detailed description when read with the accompanying drawings in which:

DETAILED DESCRIPTION

One or more embodiments relate to the field of serialized object streams. In particular, one or more embodiments relate to modelling serialized object streams for inspection and modifying the streams.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the embodiments of the invention. However, it will be understood by those skilled in the art that the embodiments of the present invention may be practiced without these specific details. In other instances, well-known methods, procedures, and components have not been described in detail so as not to obscure the embodiments of the present invention.

A tool is described that helps inspecting and modifying serialized object streams without requiring an ad hoc application to be written, and without requiring the libraries that contain the definition classes of the serialized objects. The tool enables users to view, and potentially modify, the payload content of a serialized object graph.

Figure 1:
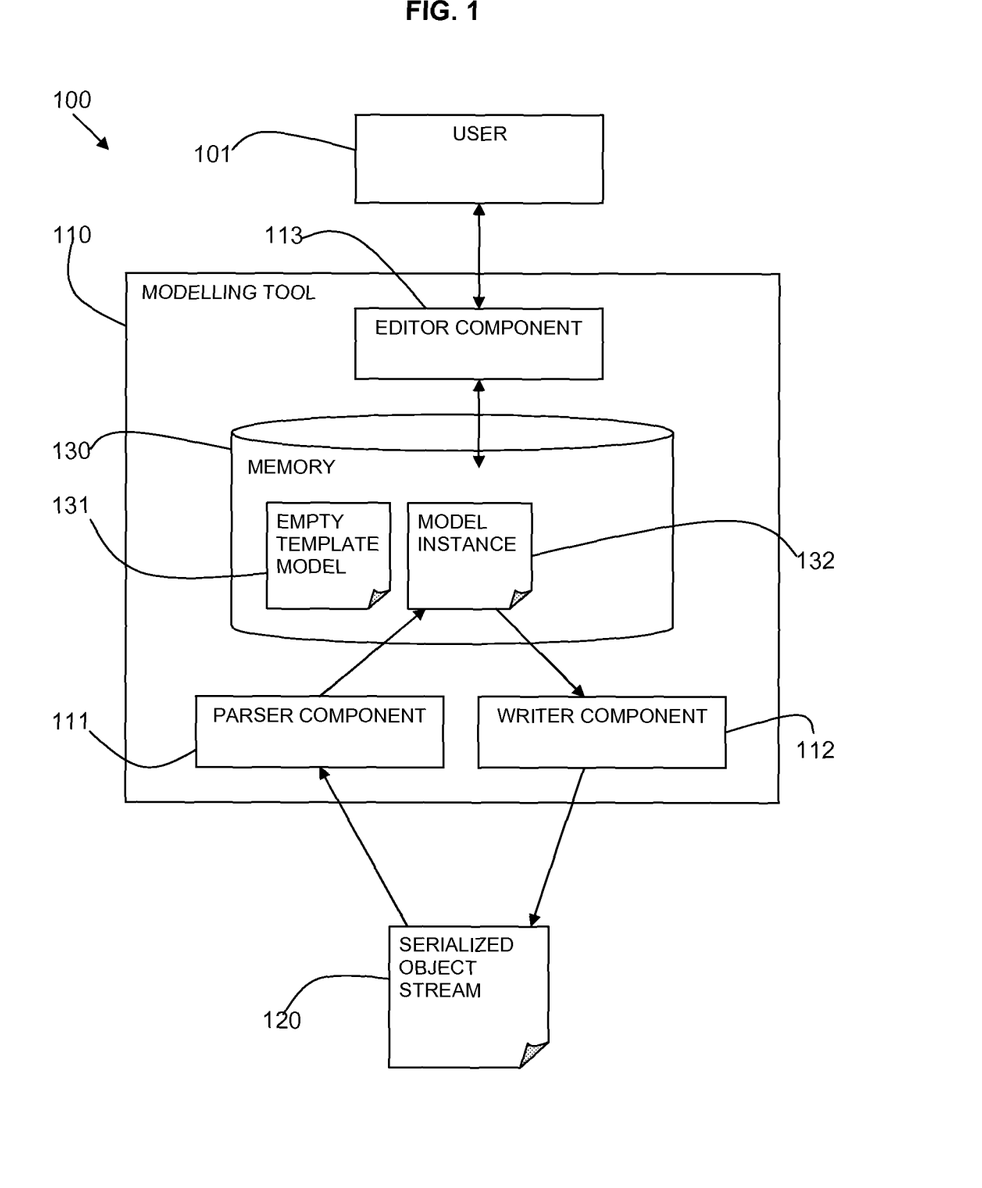
FIG. 1 is a block diagram of an embodiment of a system in accordance with an embodiment of the present invention.

Referring to FIG. 1, a block diagram shows an embodiment of the described system 100. The system 100 includes a modelling tool 110 for inspection and modifying serialized object streams 120.

The modelling tool 110 includes a parser component 111 for parsing object streams 120 and building a corresponding model 132. The parser component 111 does not require class definitions to be known in advance, instead it dynamically builds a class directory as the class descriptions are discovered in the stream 120.

Memory 130 is provided either incorporated in the modelling tool 110 or separately accessible by the modelling tool 110. The memory 130 may store an empty template model 131 and instances of models 132 as built by the parser component 111. A model instance 132 is an in-memory content representation of a serialized object stream 120.

The modelling tool 110 also includes a writer component 112 which handles the reverse operation from the parser component 111 of producing an object stream from a model 132.

The modelling tool 110 also includes an object editor component 113 which may be a graphical component that displays instances of the serialized object model 132. The object editor component 113 enables a user 101 to view information stored in an object stream and to edit the payload information, i.e., the field's content.

Figure 2:
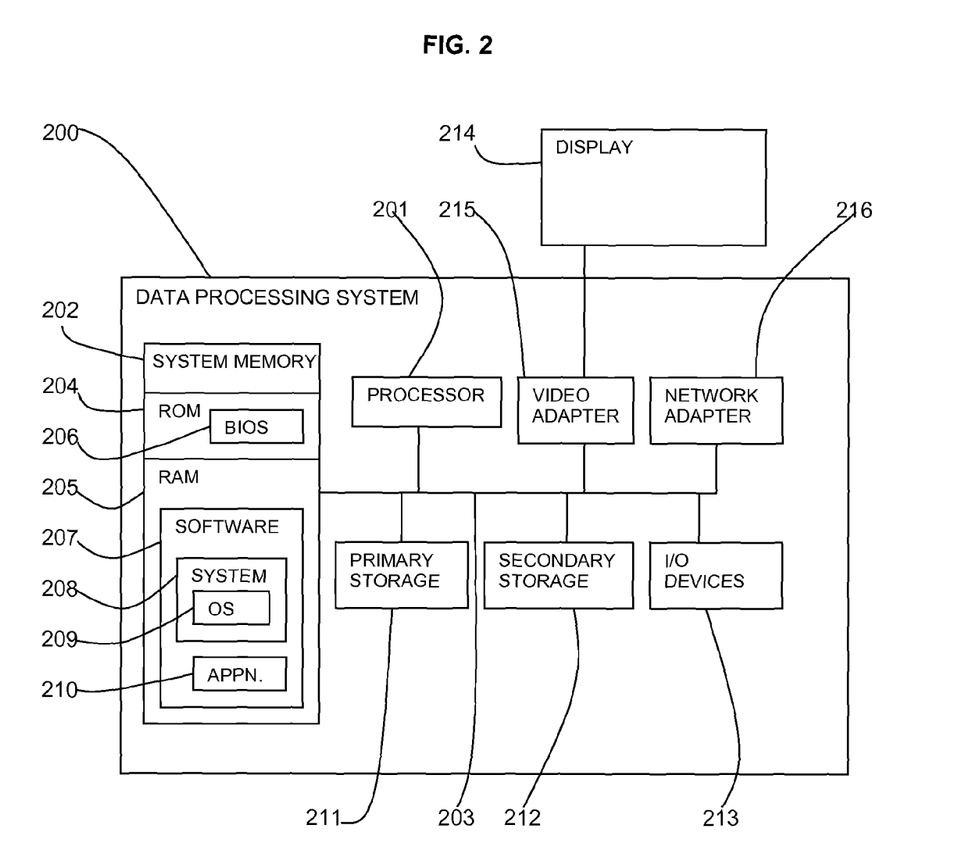
FIG. 2 is a block diagram of a computer system in which an embodiment of the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

The content of the model 132 may be considered equivalent to the content of the object stream 120, i.e., the model 132 can be constructed from the stream 120 and transformed back to the stream 120 without any loss of information.

A model 132 instance may contain three major pieces of information:
An object pool that represents the set of object instances persisted in a serialized object stream.
A class pool that represents the set of class definitions involved in a serialized object stream.
A sequence that represents the ordered list of objects, classes and data in found in the serialized object stream, in order of appearance in the stream.

The following more detailed description is provided in the context of Java Serialized Objects, although the components may be implemented in languages other than Java (for instance, C++, C# or JavaScript embedded in a browser).

In the context of Java Serialized Objects, the serialized object model instance 132 may be a set of classes that, when instantiated, reflects the content of a Java Serialized Object stream. The model instance 132 acts as light-weight replacement for the internal model of a JVM (Java Virtual Machine) for storing class definitions and object instances, and allows the modelling tool 110 to operate without a JVM. The classes may be named after the grammar definitions of the Java Object Serialization Stream Protocol.

FIGS. 3A to 3D show sections 310, 320, 330, 340 of a Unified Modeling Language (UML) diagram of classes that may be defined by the model. The classes shown in FIGS. 3A to 3D are named for this illustration after the Java terminology used in the grammar definition of the Object Stream Serialization Protocol.

Figure 3A:
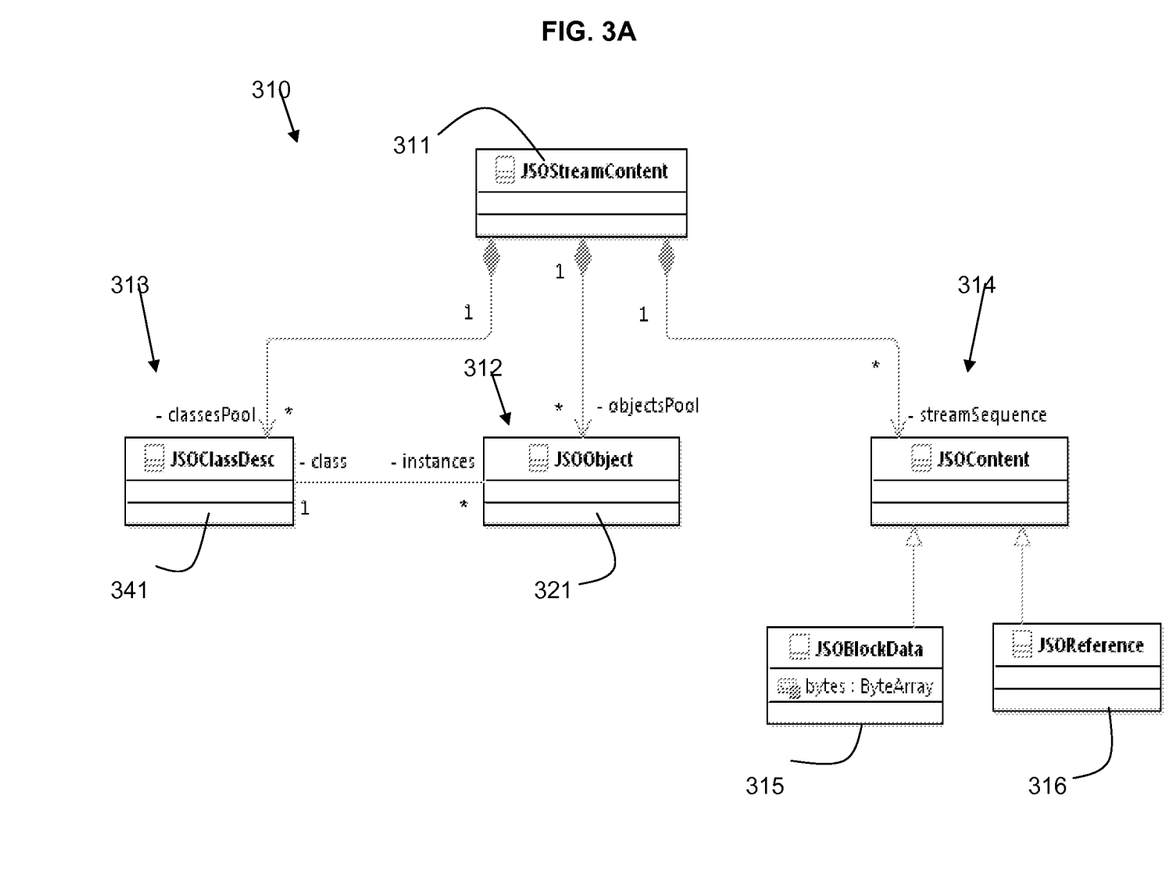
FIGS. 3A to 3D show sections of a Unified Modeling Language diagram showing a model in accordance with an embodiment of the present invention.

Referring to FIG. 3A, the model section 310 shows the stream content 311 which contains three major pieces of information:
An object pool 312 that represents the set of object instances 321 persisted in a Java Serialized Object stream referred to as JSOStreamContent::objectsPool.
A class pool 313 that represents the set of class definitions involved in a Java Serialized Object stream referred to as JSOStreamContent:classesPool.
A sequence 314 that represents the ordered list of objects, classes and data in found in the Java Serialized Object stream, in order of appearance in the stream referred to as JSOStreamContent::streamSequence. The sequence 314 may contain block data 315 and references 316.

Figure 3B:
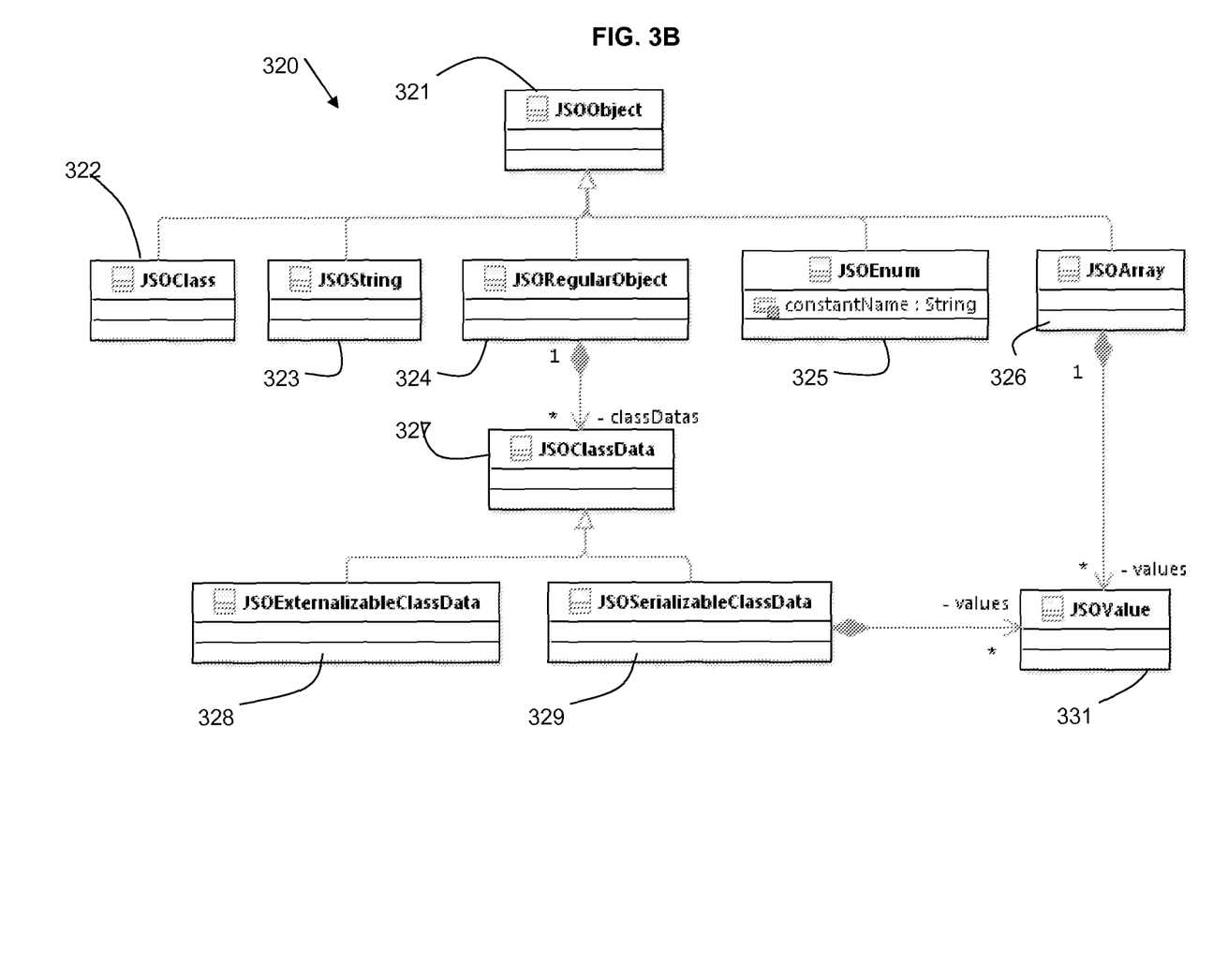

Referring to FIG. 3B, the model section 320 shows an abstract object 321 which may be either a class 322 (JSOClass), string 323 (JSOString), regular object 324 (JSORegularObject), enumeration member 325 (JSOEnum), or array 326 (JSOArray). The regular object 324 element may have multiple class data 327 (JSOClassData) which may either be externalizable class data 328 (JSOExternalizableClassData) or serializable class data 329 (JSOSerializableClassData). The elements of array 326 may have multiple values 331, one per array item. The elements of serializable class data 329 may have multiple values 331, one per class field.

Figure 3C:
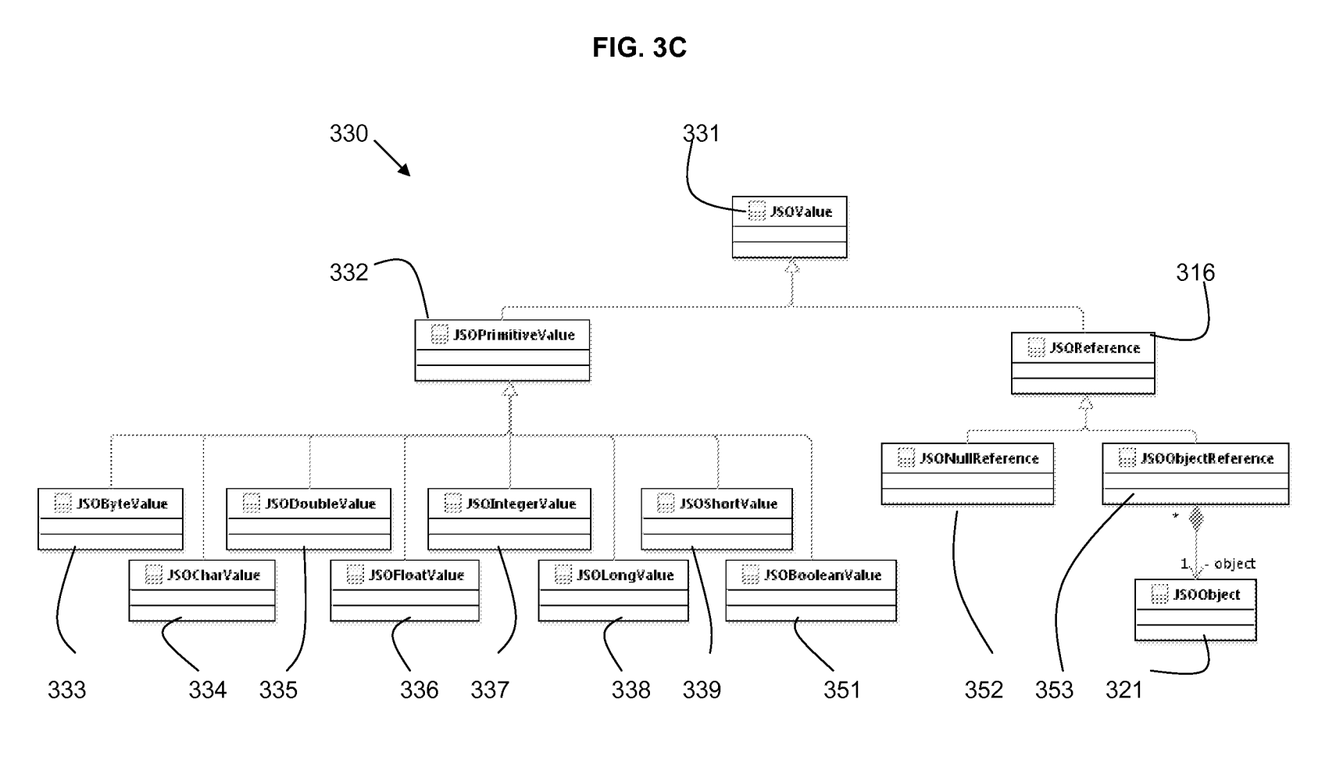

Referring to FIG. 3C, the model section 330 shows a value instance 331 which may either be a primitive value 332 (JSOPrimitiveValue) or a reference 316 (JSOReference). The primitive value 332 is either a byte value 333 (JSOByteValue), character value 334 (JSOCharValue), double value 335 (JSODoubleValue), float value 336 (JSOFloatValue), integer value 337 (JSOIntegerValue), long value 338 (JSOLongValue), short value 339 (JSOShortValue), or Boolean value 351 (JSOBooleanValue). The reference 316 may be either a null reference 352 (JSONullReference) or an object reference 353 (JSOObjectReference) which may in turn link to an object 321.

Figure 3D:
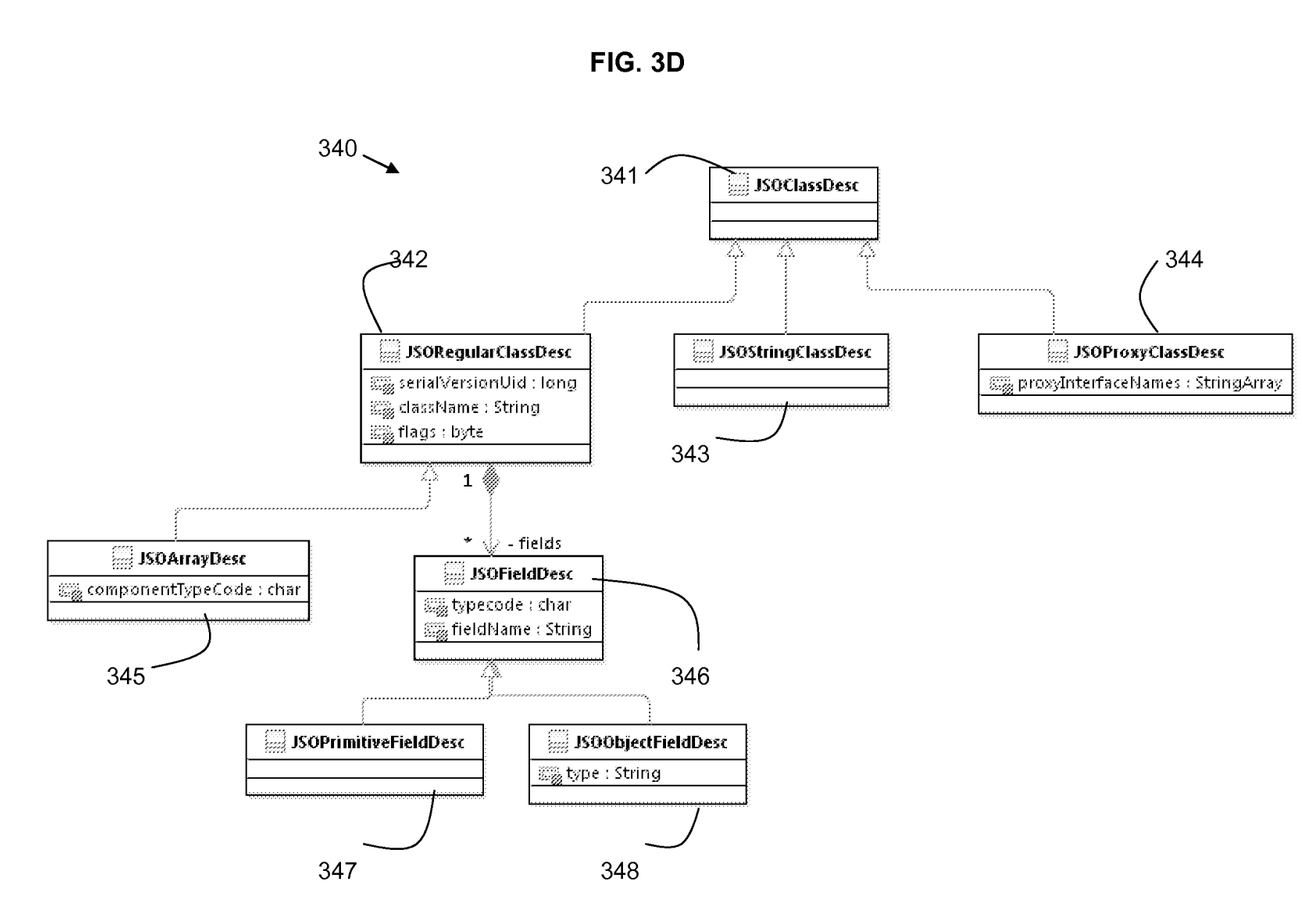

Referring to FIG. 3D, the model section 340 shows a class description instance 341 which may either be a regular class description 342 (JSORegularClassDesc), string class description 343 (JSOStringClassDesc), array class description 345 (JSOArrayDesc), or proxy class description 344 (JSOProxyClassDesc). The regular class description 342 includes elements of field description 346 (JSOFieldDesc), which may either be primitive field description 347 (JSOPrimitiveFieldDesc) or object field description 348 (JSOObjectFieldDesc).

The parser component 111 is responsible for reading the stream, in accordance with specifications for the Java Object Serialization Stream Protocol, and constructing a model instance that reflects the stream content.

As opposed to a typical implementation of a JVM parser, this parser does not require the class definitions to be known in advance, nor does it require a JVM to read the stream. Rather, it dynamically builds its class dictionary as the class descriptions are discovered in the stream.

The writer component 112 is responsible for producing a stream 132 (conformant to specifications for the Java Object Serialization Stream Protocol) from a Java Serialized Object model 120.

The editor component 113 may display a tree form, where fields are presented as children of the object they belong to. It requires a Java Serialized Object model produced using the parser described above.

Objects may be laid out in various ways:
As a flat list;
Grouped by classes;
Arranged in a "reference" tree. That is to say if an object B is referenced by an object A's field, B is represented as the child of A.

Fields representation may depend on their type:
A "terminal" field may be represented in a single line, composed of the field name, and the field value. The field value may be edited. A field is said to be terminal if it is of a primitive type (int, long, double . . . ), if it is a primitive type wrapper (Integer, Float . . . ) or a String. This list is not exhaustive and may be extended to other Object types (such as BigDecimal or Date for instance). The text area allows only valid input for the field's type (for instance, typing the character 'c' in an integer field is not allowed).

Reference fields are either represented as a link, that, when clicked, moves the view to the referenced object, or the referenced object is presented as a child of the referencing object.

Array-type fields are represented as a sub-list of objects. Items may be removed and reordered. If the array item type is terminal, new items may be added.

The editor component 113 enables editing of any terminal field, however it does not allow "structural" changes, i.e., changing a non-terminal field type, or replacing a null value with a non-null value. It allows, however, replacing a non-null reference with a null value.

Apart from editing operations, the editor component 113 allows a serialized stream to be read from a file, and, if any changes are made in the editor component 113 to the content, the modified version is saved to a file.

Figure 4:
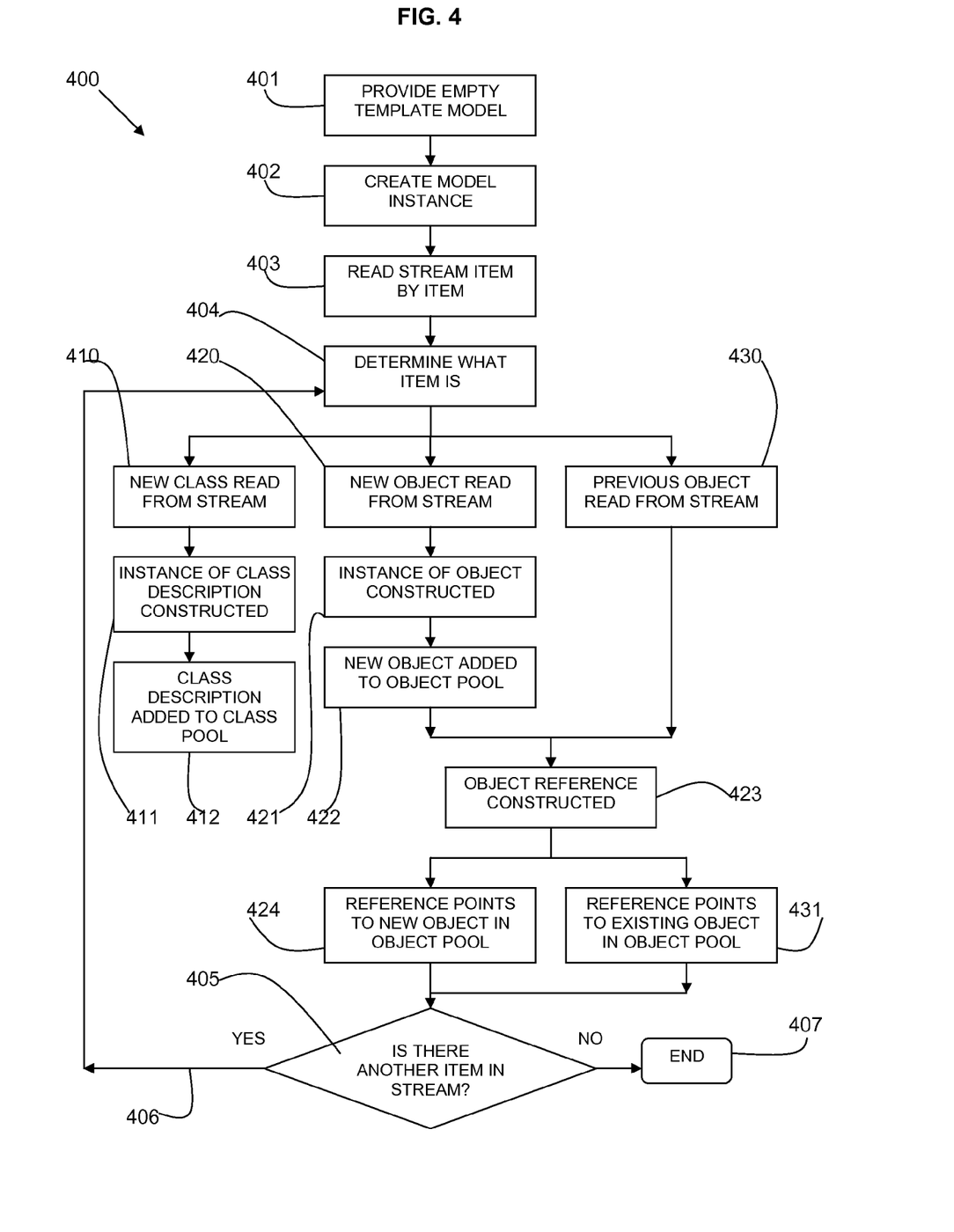
FIG. 4 is a flow diagram of an embodiment of an aspect of the present invention.

Referring to FIG. 4, a flow diagram 400 shows the method carried out by the parser component of the modelling tool.

An initial empty template model is provided 401. The object pool and class pool of the model are initially empty. A unique model instance of content is created 402. (This is the stream content 311 in FIG. 3A)

A stream is received and read 403, one item at a time. It is determined 404 what an item is, namely a new class 410, a new object 420, or a previous object 430 and an appropriate course is taken.

If a new class 410 is read from the stream, an instance of generic class description is constructed 411 (class description 341 FIG. 3D) and added 412 to the class pool (class pool 313 of FIG. 3A) together with information about its nature and its structure. (The nature of the class description may include regular 342, array 345, proxy 344 or string 343, and the structure in the case of a regular class may include name and type of fields 346 all referenced in FIG. 3D).

If a new object 420 is read from the stream, an instance of a generic object is constructed 421 (object 321 in FIG. 3B) and added 422 to the object pool (object pool 312 in FIG. 3A). (As shown in FIG. 3B, the object 321 may include information about its type, such as regular 324, string 323, enum 325, array 326, class 322 and its values such as fields in the case of a regular object, items in the case of an array, value in the case of a string, constant name in the case of a enum, qualified name in the case of a class).

If a new object 420 or previous object 430 is read, an object reference (reference 316 in FIG. 3C) is constructed 423. In the case of a new object, the reference points 424 to the new object in the object pool. In the case of a previous object, the reference points 431 to an existing object that is already in the object pool.

It is determined 405 if there are more items in the stream. If so, the method loops 406 to determine 404 the next item. If there are no more items in the stream, the method ends 407.

The writer component when producing an object stream from a model, proceeds by iterating through the sequence list of the model and serializing each data, object, and class in the order they are encountered.

When serializing a reference, it either produces a new object item if the referenced object has not been already serialized, or a previous object item if the referenced object has already been serialized.

The described modelling tool provides a method of reading a serialized object stream without requiring any external information about the types (classes) of the deserialized objects.

Additionally, the described method does not claim to provide a method for constructing instances of objects that are identical to those that were serialized (so it is not a deserialization method), but only to provide a structured, human-readable model of the serialized objects and their structure.

In the described method and system, the stored elements are object descriptors and class descriptors so a back-reference found later in the same input sequence can be linked to the referenced object descriptor.

The described modelling tool enables developers to inspect quickly the content of a serialized stream without writing a "toString( )" method. It also enables testers to view output data and create variations (data sets) of input data to test an application or a server that relies on serialization. Furthermore, the modelling tool allows security inspectors to verify information that could be stolen or altered when an application or a client/server communication relies on serialization. These are example usages and the tool may have other applications not listed here.

One or more embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

One or more embodiments of the invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for modelling a serialized object stream, comprising:
   receiving a stream of bytes corresponding to the serialized form of a first object;
   creating an empty initial model for containing a generic object and a generic class;
   upon detection of a class from said stream, constructing a corresponding generic class object in the model using a processor;
   upon detection of a new object from said stream, constructing a corresponding generic object in the model; and
   referencing further objects and classes in the model that are associated with the generic objects and classes.

2. The method of claim 1, further comprising:
   dynamically building a model as a content representation of the serialized object stream without referencing a library of definitions of classes of the serialized object; and
   dynamically building a class directory as classes are discovered in the stream.

3. The method of claim 2, wherein the model includes a sequence representing an ordered list of objects, classes and data found in the stream in the order of occurrence in the stream.

4. The method of claim 1, wherein upon detection of a class from said stream, adding a class description to a class pool.

5. The method of claim 1, wherein upon detection of a new object from said stream, adding the new object to an object pool.

6. The method of claim 5, wherein upon detection of a new object from said stream, constructing an object reference pointing to the new object in the object pool.

7. The method of claim 5, wherein upon detection of a previous object from said stream, constructing an object reference pointing to an existing object in the object pool.

8. The method of claim 1, further comprising:
   reproducing a serialized object stream from a model by iterating through a sequence list of the model and serializing each data, object and class in order.

9. The method of claim 8, further comprising:
   adding a new object item if a referenced object has not already been serialized; and
   adding a previous object item if a referenced object has already been serialized.

10. The method of claim 1, further comprising:
    displaying an instance of a model; and
    enabling a user to edit the field content of the model.

11. The method of claim 10, wherein displaying an instance of a model displays the model in tree form with fields presented as children of the object to which the fields belong.

12. The method of claim 10, wherein displaying an instance of a model includes representing objects in the form of one of the group of: a flat list, grouped by classes, or arranged as a reference tree.

13. A system for modelling a serialized object stream, comprising:
    a processor configured to perform operations comprising:
    receiving a stream of bytes corresponding to the serialized form of a first object;
    creating an empty initial model for containing a generic object and a generic class;
    upon detection of a class from said stream, constructing a corresponding generic class object in the model;
    upon detection of a new object from said stream, constructing a corresponding generic object in the model; and
    referencing further objects and classes in the model that are associated with the generic objects and classes.

14. The system of claim 13, wherein the processor is further configured to perform operations comprising:
    dynamically building a model as a content representation of the serialized object stream without referencing a library of definitions of classes of the serialized object; and
    dynamically building a class directory as classes are discovered in the stream.

15. The system of claim 14, wherein the model includes a sequence representing an ordered list of objects, classes and data found in the stream in the order of occurrence in the stream.

16. The system of claim 13, wherein the processor is further configured to perform operations comprising:
    reproducing a serialized object stream from a model by iterating through a sequence list of the model and serializing each data, object and class in order.

17. The system of claim 13, wherein the processor is further configured to perform operations comprising:
    displaying an instance of a model and enabling a user to edit the field content of the model.

18. A computer program product for modelling a serialized object stream, comprising:
    a computer readable storage medium having program code embodied therewith, the program code executable by a processor to perform operations comprising:

receiving a stream of bytes corresponding to the serialized form of a first object;

creating an empty initial model for containing a generic object and a generic class;

upon detection of a class from said stream, constricting a corresponding generic class object in the model;

upon detection of a new object from said stream, constructing a corresponding generic object in the model; and referencing further objects and classes in the model that are associated with the generic objects and classes.

19. The computer program product of claim 18, wherein the program code is further executable by a processor to perform operations comprising:

dynamically building a model as a content representation of the serialized object stream without referencing a library of definitions of classes of the serialized object; and dynamically building a class directory as classes are discovered in the stream.

20. The computer program product of claim 19, wherein the model includes a sequence representing an ordered list of objects, classes and data found in the stream in the order of occurrence in the stream.

21. The computer program product of claim 18, wherein the program code is further executable by a processor to perform operations comprising:

reproducing a serialized object stream from a model by iterating through a sequence list of the model and serializing each data, object and class in order.

22. The computer program product as claimed in claim 18, wherein the program code is further executable by a processor to perform operations comprising:

displaying an instance of a model and enabling a user to edit the field content of the model.

* * * * *